United States Patent Office
3,523,846
Patented Aug. 11, 1970

3,523,846
PROCESS FOR THE PRODUCTION OF POROUS, SELF-ADHESIVE TAPES OR SHEETS, PARTICULARLY PLASTERS
Heinz Muller, 74 Brahmsallee, Hamburg 13, Germany
No Drawing. Filed Aug. 12, 1966, Ser. No. 571,968
Claims priority, application Germany, Aug. 20, 1965, B 83,366
Int. Cl. A61l *15/06;* B32b *31/08*
U.S. Cl. 156—78                    4 Claims

ABSTRACT OF THE DISCLOSURE

Porous, self-adhesive tapes, particularly plasters, are obtained by applying a visco-elastic self-adhesive mass in the form of a solution or dispersion to an intermediate layer with an adhesive-repellent surface, converting the same into a fine vesicular condition (i.e., forming numerous very small bubbles) by rapid evaporation of the solvent or dispersion medium at increased temperature, and transferring the fully-dried adhesive layer thus obtained to a porous base by cooling it to room temperature and applying it to the porous base under pressure. By the final pressure treatment under a relatively high pressure the bubbles are broken, whereby a very fine-pored, microporous structure forms, by which the desired air- and water vapor-permeability of the tapes or plasters is achieved. At the same time, good anchorage of the adhesive layer to the porous base is obtained.

---

The invention relates to porous, self-adhesive tapes or sheets, particularly plasters for dressing wounds, and a process for the production of such porous, self-adhesive tapes or sheets, by a novel method of supplying a porous base with a microporous adhesive layer.

The preparation of self-adhesive tapes, particularly of plasters, is usually carried out in such a way that the adhesive material, which should exhibit simultaneously a strong adhesion in addition to a large inner cohesion, is applied with or without use of a solvent medium after the usual process of coating of bases of different kinds.

It is known that plasters are more highly compatible to the skin the greater is their air- and water vapour-permeability.

To achieve the necessary air- and water vapour-permeability of the finished plasters, it is known either to provide the preferably porous base material, which can consist for instance of woven or non-woven material and also films of different kind, by suitable mechanical means with a discontinuous adhesive coating bounded by the adhesive-free part, or else to subsequently perforate the material completely coated with adhesive. The adhesive and film can be perforated in one operation by use of plastic film as base material.

Plasters manufactured by these known processes exhibit, in many cases, undesirably large pores in the adhesive layer. Plasters perforated by mechanical means are frequently not satisfactory with regard to the standards which are currently set for porous plasters with regard to the air- and water vapour-permeability.

In a process for the production of porous plasters, it is known to produce microporous adhesive layers by rapid cooling (sudden setting) of an adhesive coating applied to a porous base from a melt in suitable concentration. This process is limited however to low-melting rubbery plastics and preferably to mixtures of polyvinyl ethers of different polymerization grades.

According to a further known method whereby such plasters with microporous adhesive layers are produced, the adhesive is first applied in the form of a solution in an organic solvent medium to an intermediate support with a smooth, adhesive-repellent surface, is partially dried on this intermediate support by warming and finally is applied in the half-dry state as a dressing on the porous base, whereby the residual solvent medium can escape through the porous base on further warming and the microporous adhesive formed spreads into the porous base material by capillary and contractive forces. In this method it is important that the pre-drying of the adhesive coating on the intermediate support is only carried out to such an extent that after bringing into contact with porous base, on the one hand penetration through the base material is avoided and on the other hand a sufficient amount of solvent medium remains in the adhesive layer to cause the formation of pores by the evaporation of this residual solvent medium and the consequent shrinking. For this, careful regulation of the drying conditions is necessary, which makes this known process complicated and uneconomical.

An object of the present invention is to provide a process for the preparation of porous, self-adhesive tapes or sheets, particularly plasters, according to which a microporous adhesive is produced on a porous base by a simple, economical method and which presents advantages over the known methods of preparation of microporous plasters in that it can be carried out quickly and without great expense, it is easily reproducible and it needs no careful regulation of temperature conditions.

According to the invention porous, self-adhesive tapes, particularly plasters, are obtained by applying a visco-elastic self-adhesive mass in the form of a solution or dispersion, to an intermediate layer with an adhesive-repellent surface, converting the same into a fine vesicular condition by rapid evaporation of the solvent or dispersion medium at increased temperature, and transferring the fully-dried adhesive layer thus obtained to a porous base by cooling it to room temperature and applying it to the porous base under pressure.

A convenient method of effecting the transfer of the fully-dried adhesive layer from the intermediate support to the porous base, consists in covering the adhesive layer with the porous base, passing the composite obtained between two contra-rotating rollers at room temperature under a pressure of about 30 to 120 kg./cm.$^2$, and preferably at a pressure of about 80 to 120 kg./cm.$^2$. For this purpose the use of calender rolls is especially suitable.

By the rapid evaporation of solvent or dispersion medium from the adhesive layer obtained on the intermediate support, the dried adhesive is permeated with numerous very small bubbles which, for the most part, cannot be detected by the naked eye. These bubbles are broken by the final pressure treatment, whereby a very fine-pored, microporous structure forms, by which the desired air- and water vapour-permeability of the plasters is achieved. At the same time good anchorage of the adhesive layer to the porous base is obtained in this way. By an adhesive layer with microporous structure is understood an adhesive layer which exhibits a multiplicity of such small pores that these cannot be seen by a casual glance of the human eye over an adhesive strip so-manufactured, but rather gives the impression of an unbroken adhesive layer. In spite of their smallness these pores have an adequate size to ensure the necessary air- and water vapour-permeability of a plaster manufactured in this way.

For the preparation of adhesive layers with microporous structure, the use of visco-elastic, self-adhesive materials is essential, i.e. an adhesive material such that it shows a viscous as well as an elastic nature, as is the case for example with an adhesive of polyacrylic acid esters or acrylic acid ester-copolymers. This visco-elastic nature produces an adhesive such that the numerous very small bubbles formed by rapid evaporation of the solvent or dispersion medium are broken by the suddenly applied high pressure so that the desired fine pored or microporous structure results.

It was not foreseen and therefore surprising that the adhesive would not penetrate (i.e. filter) through the porous base when the high pressure of the roller process was used on the composite product formed from intermediate support, adhesive layer and porous base.

The invention also includes porous, self-adhesive tapes, sheets or the like, particularly plasters, with a porous, flexible base which carry a finely-porous or microporous adhesive layer and which are produced by the transfer of a visco-elastic self-adhesive coating in finely vesicular condition, which is obtained by rapid evaporation of a solvent or dispersion medium at high temperature, from an intermediate support to the porous base and by use of high pressure on the dried and room temperature-cooled visco-elastic self-adhesive.

As intermediate supports with adhesive-repellant surfaces for the process according to the invention, smooth paper which is provided with a hardened silicone layer or coated with another adhesive-repellant medium can advantageously be used. For this purpose it is also possible to use adhesive-repellant-coated or highly polished metal strips or sheets, so that with regard to the choice of an intermediate support there are many possibilities.

As porous bases for the production of porous, self-adhesive tapes and plasters according to the process of the invention may be used non-woven carrier-materials such as non-woven fabrics (fleeces or mats) of various kinds, whose physical and chemical properties can be varied within broad limits by the appropriate choice of textile fiber material and/or of binding agent, but also foam layers and woven materials. Microporous plastic films or foils can also serve as base layers.

Especially advantageous results are obtained if an impregnated and hydrophobic non-woven fibrous backing of randomly interlaced viscose-rayon textile fibers is chosen as base layer material.

The impregnation of the textile web can be carried out in the usual way with solutions or aqueous dispersions of known binding agents, e.g. of polyacrylic acid esters or acrylic acid ester-copolymers, and finally drying and compressing. In the event that the chosen binding agent does not itself show a hydrophobic effect, the web can be treated additionally with a hydrophobic material such as, for examples, a melamine resin modified by stearyl groups, to give the required degree of water-repellence.

If desired, the porous base layer provided with the microporous adhesive layer may be subjected to a short heat treatment, preferably at a temperature of about 140° C., to improve the anchorage of the adhesive layer to the porous base material still further. If a binding agent containing carboxyl groups is used for the impregnation of the porous base layer and at the same time a visco-elastic adhesive which contains reactive groups is chosen, an additional anchoring effect is obtained during this brief heat treatment, by chemical reaction.

The following examples will serve to illustrate the invention:

EXAMPLE 1

A visco-elastic, self-adhesive mass, which is obtained by copolymerisation of 490 parts by weight 2-ethylhexyl acrylate, 490 parts by weight n-butyl acrylate and 20 parts by weight glycidyl methacrylate, is applied to a paper base (laminated paper) provided with a hardened silicone coating by the knife- or blade-coating process by means of a doctor blade, from a solution in an acetone-benzene mixture in such quantities that, after drying, a coating weight of about 30 g./m.$^2$ is obtained. Other coating processes, such as e.g. coating by means of a roller system, can be used in place of the coating process mentioned for carrying out the invention. For the purpose of rapid evaporation of the solvent mixture, the adhesive-repellent, paper base coated with the adhesive is passed through a drying channel heated in stages, which is divided into 6 heated zones at temperatures of 40, 50, 50, 60, 60 and 70° C., at a speed of about 7 m./min. By this rapid drying process, a multiplicity of tiny bubbles with a diameter of about 5 to 15 microns are formed in the adhesive layer.

Afterwards the siliconised paper provided with the now finely-vesicular adhesive layer is brought into contact (laminated) with a matted textile web by means of suitable pressure rollers, in such a way that the textile web comes to lie directly on the adhesive layer. As matted textile web there is used a material which has a density of about 25 g./m.$^2$ on a viscose-rayon base, which has a small number of polyvinyl alcohol fibres and which has been previously impregnated with an acrylic acid-ester copolymer containing carboxyl groups to such an extent that the material, after drying, contains 15 g./m.$^2$ of the binding agent. The adhesive layer and matted textile web so obtained in layers on the paper base are then calendered at room temperature at a speed of about 10 m./min. under a pressure of about 100 kg./cm.$^2$. The bubbles in the adhesive layer are thereby destroyed by the high pressure, and the adhesive layer is transferred from the paper base to the matted textile web and is anchored onto this at the same time. Finally the layered composite is warmed for a period of about 3 minutes at a temperature of about 140° C. in order to allow the carboxyl groups of the impregnating material to react with the reactive groups of the adhesive. After this warming treatment, the siliconised paper base can be removed from the porous self-adhesive strip formed and, if necessary, used many times again for the same purpose.

The finished porous, self-adhesive strip or plaster can then be cut into strips of the desired width and wound up into rolls. In order to facilitate unrolling, the back side of the porous base can be provided with a thin coating of an adhesive-repellent medium.

The air-permeability of such a plaster is about 4 cm.$^3$/cm.$^2$/sec. (measured with the densometer Type 8201 supplied by the firm Albert Dargatz, Hamburg, Germany).

The porous, self-adhesive strips, sheets or plasters obtained by the process according to the invention are transparent, air- and water vapour-permeable, can be sterilized and are easily finger-tearble without the use of mechanical aids. On account of their transparency they permit the ready examination of wounds. They are extremely flat, and so are excellent for the purpose of wound dressing.

EXAMPLE 2

A paper base with a hardened silicone coating is coated by means of a doctor blade with a self-adhesive mass of the following composition in the form of a solution in benzene:

Parts by wt.
Polyvinylisobutyl ether with a K-value of about 120 ("Oppanol C" BASF) _____ 45
Methyl ester of hydrogenated rosin ("Hercolyn-Harz," Hercules Powder) _____ 21
Polyvinylisobutyl ether, low viscosity, with a K-value of about 30 ("Lutanol I 30" BASF) _____ 27
Mineral oil ("Circo light process oil") _____ 6
Antioxidising agent (oxycresyl campher) _____ 1

The drying of the applied adhesive solution is carried out as given in Example 1. The coating weight of this application, after drying, is 25 g./m.$^2$. Finally a foam sheet made from a porous polyurethane is laminated with the finely-vesicular adhesive layer and the composite so obtained is calendered at room temperature at a speed of 16 m./min. at a pressure of 120 kg./cm.$^2$.

EXAMPLE 3

A visco-elastic, self-adhesive mass of the kind described in Example 1 in the form of a solution in an acetone-benzene mixture is applied by means of a doctor blade to an endless steel band provided with a polytetrafluorethylene coat, in such a quantity that, after drying, a coating weight of about 25 g./m.² is obtained. The drying of the adhesive layer is carried out in the way given in Example 1.

The adhesive layer, permeated with fine bubbles, on the endless steel band, is laminated with a matted textile web which has been previously impregnated with an acrylic acid-ester copolymer containing carboxyl groups, in such a way that the textile web comes to lie directly on the adhesive layer. The composite adhesive layer and textile web so obtained on the endless metal band is then passed at room temperature at a speed of about 10 m./min. under a pressure of about 60 kg./cm.² through the nip of two contra-rotating rollers and finally warmed for a period of about 3 minutes at a temperature of about 140° C. in order to allow the carboxyl groups of the impregnating agent to react with the reactive groups of the adhesive.

The textile web so produced and provided with a microporous adhesive layer is then removed from the endless steel band, cut into strips and wound up into rolls.

The words Oppanol, Hercolynharz, Lutanol and Circo are trademarks.

I claim as my invention:

1. In a process for the production of porous, self-adhesive tapes, sheets and plasters, wherein a layer of a visco-elastic self-adhesive mass in a liquid medium is applied to an intermediate support having an adhesive-repellant surface, dried by warming and brought into contact with a porous base, the improvement wherein the said layer of a visco-elastic self-adhesive mass in a liquid medium on the intermediate support is converted into a finely-vesicular condition by rapid evaporation of the liquid medium at a raised temperature, and the fully-dried adhesive layer thus obtained is transferred to a porous base by cooling it to room temperature, covering it with the base, and passing the assembly thus obtained between two contra-rotating rollers at room temperature under a pressure of about 30 to 120 kg./cm.².

2. A process according to claim 1, wherein a pressure between 80 and 120 kg./cm.² is employed.

3. A process according to claim 1, wherein, after transfer of the adhesive layer to the porous base, the composite product is subjected to a brief heat treatment at a temperature of about 140° C.

4. A process according to claim 1, wherein the drying is effected at temperatures in the range of about 40° to 70° C.

References Cited

UNITED STATES PATENTS

| | | | |
|---|---|---|---|
| 2,618,580 | 11/1952 | Lancaster | 156—231 |
| 2,865,783 | 12/1958 | Henderson | 156—231 |
| 3,087,850 | 4/1963 | Cole | 156—230 |
| 3,405,206 | 10/1968 | Abell | 156—238 |
| 3,121,021 | 2/1964 | Copeland | 128—156 XR |
| 3,307,544 | 3/1967 | Gander | 161—249 XR |

JOHN T. GOOLKASIAN, Primary Examiner

R. A. KILLWORTH, Assistant Examiner

U.S. Cl. X.R.

117—135.5; 128—156; 156—231, 238; 161—167, 249